US011867183B2

United States Patent
Van Hove et al.

(10) Patent No.: US 11,867,183 B2
(45) Date of Patent: Jan. 9, 2024

(54) TRANSMISSION AND COMPRESSOR OR VACUUM PUMP PROVIDED WITH SUCH A TRANSMISSION

(71) Applicant: ATLAS COPCO AIRPOWER, NAAMLOZE VENNOOTSCHAP, Wilrijk (BE)

(72) Inventors: Linus Van Hove, Wilrijk (BE); Steven De Man, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 241 days.

(21) Appl. No.: 16/610,539

(22) PCT Filed: Mar. 13, 2018

(86) PCT No.: PCT/IB2018/051662
§ 371 (c)(1),
(2) Date: Nov. 4, 2019

(87) PCT Pub. No.: WO2018/203152
PCT Pub. Date: Nov. 8, 2018

(65) Prior Publication Data
US 2020/0072221 A1 Mar. 5, 2020

Related U.S. Application Data

(60) Provisional application No. 62/501,245, filed on May 4, 2017.

(30) Foreign Application Priority Data

Jan. 24, 2018 (BE) .................................. 2018/5037

(51) Int. Cl.
*F04C 29/12* (2006.01)
*F04C 29/00* (2006.01)
(Continued)

(52) U.S. Cl.
CPC .............. *F04C 29/12* (2013.01); *F04B 53/00* (2013.01); *F04C 18/08* (2013.01);
(Continued)

(58) Field of Classification Search
CPC ..... F04C 29/12; F04C 29/0042; F04C 29/026
See application file for complete search history.

(56) References Cited

U.S. PATENT DOCUMENTS 2,950,046 A * 8/1960 Lorenz .................. F04C 18/126
418/84
3,163,999 A * 1/1965 Ditzler .................. F25B 31/002
62/469
(Continued)

FOREIGN PATENT DOCUMENTS

JP   S59176491 A   10/1984
JP   H0381593 A    4/1991
(Continued)

OTHER PUBLICATIONS

English translation of JPH05296171 by PE2E translation Feb. 6, 2023.*

(Continued)

*Primary Examiner* — Deming Wan
(74) *Attorney, Agent, or Firm* — BACON & THOMAS, PLLC

(57) ABSTRACT

Transmission between drive shaft and a driven shaft, which transmission includes a housing and at least a driven gearwheel that is mounted on the driven shaft and a drive gearwheel that is mounted on a drive shaft. The housing is provided with an outlet opening, which outlet opening is placed in the radial extension of one of the gearwheels.

4 Claims, 2 Drawing Sheets

(51) Int. Cl.
  *F04C 29/02* (2006.01)
  *F04C 18/16* (2006.01)
  *F04B 53/00* (2006.01)
  *F16H 37/02* (2006.01)
  *F04C 18/08* (2006.01)

(52) U.S. Cl.
  CPC ........ *F04C 29/0042* (2013.01); *F04C 29/026* (2013.01); *F16H 37/02* (2013.01); *F04C 2240/30* (2013.01)

(56) References Cited

U.S. PATENT DOCUMENTS

| | | | | |
|---|---|---|---|---|
| 4,159,255 | A | * | 6/1979 | Gainer .................. F25B 31/002 252/68 |
| 4,632,650 | A | * | 12/1986 | Frieden .................... F16J 15/40 418/95 |
| 5,011,388 | A | * | 4/1991 | Aoki ..................... F04C 29/026 184/6.24 |
| 6,139,298 | A | * | 10/2000 | Kojima ............... F04C 29/0071 428/137 |
| 6,612,820 | B1 | * | 9/2003 | Staat ..................... F04C 27/009 418/104 |
| 7,214,036 | B2 | | 5/2007 | Yoshimura |
| 2006/0018773 | A1 | | 1/2006 | Yoshimura |
| 2009/0129956 | A1 | | 5/2009 | Picouet |
| 2012/0257997 | A1 | | 10/2012 | Morita et al. |
| 2013/0025405 | A1 | | 1/2013 | Arisawa et al. |

FOREIGN PATENT DOCUMENTS

| | | | | |
|---|---|---|---|---|
| JP | H05209594 | A | | 8/1993 |
| JP | H05296171 | A * | 11/1993 | .............. F04C 25/02 |
| JP | H094580 | H | | 1/1997 |
| JP | 2004068658 | A | | 3/2004 |
| JP | 2011012805 | A | | 1/2011 |
| JP | 2012132374 | A | | 7/2012 |
| WO | 8303641 | A1 | | 10/1983 |
| WO | 0042322 | A1 | | 7/2000 |
| WO | 2016136482 | A1 | | 9/2016 |

OTHER PUBLICATIONS

International Search Report in corresponding PCT Application No. PCT/IB2018/051662, dated Jun. 14, 2018.
Written Opinion in corresponding PCT Application No. PCT/IB2018/051662, dated Jun. 14, 2018.
International Preliminary Report on Patentability in corresponding PCT Application No. PCT/IB2018/051662, dated Aug. 9, 2019.
Written Opinion of the International Preliminary Report on Patentability in corresponding PCT Application No. PCT/IB2018/051662, dated Apr. 5, 2019.

* cited by examiner

TRANSMISSION AND COMPRESSOR OR VACUUM PUMP PROVIDED WITH SUCH A TRANSMISSION

The present invention relates to a transmission and a compressor or vacuum pump provided with such transmission.

BACKGROUND OF THE INVENTION

It is known that a transmission between a drive shaft of a motor and the driven shaft of, for example, a rotor of a compressor element, is provided with a housing in which the gearwheels of the transmission are located.

In order to ensure a proper operation, oil is injected in the housing of the transmission to serve as lubricant.

As the driven shaft runs from the compressor element to the transmission, seals are provided between the compressor element and the transmission.

However, there will always be some leakage flow, which means some air will end up in the housing of the transmission thus causing a pressure build-up in the transmission.

It is important to get rid of such positive pressure as said seals should not be exposed to too big a pressure difference because this can affect their proper operation.

If the pressure difference is too great it is possible that air will leak from the transmission to the compressor element. This air will also contain the injected lubricant.

Such situation needs to be avoided at all times, as this lubricant will unintentionally end up in the compressor element and cause the compressed air generated by the compressor element to be polluted with the lubricant.

Certainly in the case of oil-free applications whereby pure compressed air is required, such situation is not tolerable.

The positive pressure could be let off into the atmosphere. This means that air with the lubricant ends up in the atmosphere. Such situation is preferably to be avoided for oil-free applications, as this lubricant will end up on or near the machine, and in so doing may accidentally also end up in the machine.

This is why the housing of the transmission is connected with an oil separator to be able to purify the oil-air mixture in the transmission via the oil separator and to let it off into the atmosphere. The separated oil can be channelled back to an oil reservoir, to subsequently be injected back into the transmission.

In the known transmissions, use is made of compressed gas to obtain extraction from the transmission to the oil separator via a venturi channel.

Part of the compressed gas generated by the compressor is used for this which is branched off to said venturi channel. Consequently, the oil-air mixture will be extracted from the transmission, whereby the compressed gas and the oil-air mixture are blown through a filter.

Naturally this implies a loss of efficiency of the machine.

Moreover, the branch can be interrupted or detach, such that the venturi channel loses its effect, such that no extraction to the oil separator takes place.

Alternatively, it is also possible to obtain extraction via an external (electrical) source with, for example, a ventilator.

However, this solution also implies an extra consumption of electricity, and also an additional risk if the external source fails, for example, in case of a power failure or break in the cable.

SUMMARY OF THE INVENTION

The purpose of the present invention is to provide a solution to at least one of the aforementioned and other disadvantages.

The object of the present invention is a device, a transmission between a drive shaft and a driven shaft, which transmission comprises a housing and at least a driven gearwheel that is mounted on the driven shaft and a drive gearwheel that is mounted on a drive shaft, characterized in that the housing is provided with an outlet opening, which outlet opening is placed in the radial extension of one of the gearwheels.

'In the radial extension' means that the outlet opening extends according to a radial direction of the gearwheel. This means according to a direction of a line that extends from the centre of the gearwheel.

The gearwheel will generate a so-called 'gearwind' by its rotation, i.e. an air flow or vortex by the rotating teeth of the gearwheel, which will ensure that the oil-air mixture in the housing of the transmission is expelled radially.

An advantage of the outlet opening placed in the radial extension of the gearwheel is that the oil-air mixture is led by said 'gearwind' precisely to this outlet opening.

The outlet opening can be further connected with an oil separator or oil filter and/or with an oil reservoir.

The effect of said 'gearwind' empties the housing and the oil-air mixture will be sent to the oil reservoir or to the oil filter or oil separator.

Another major advantage is that this system does not require any external power source, i.e. compressed air or electricity.

This also means there is no risk of failure or defect by a shut-down of this external power source.

Furthermore, it is an automatic self-regulating system: the faster the gearwheels rotate, the more leakage flow there will be from the compressor element to the transmission, and the extraction of the housing of the transmission will be greater the faster the gearwheels rotate.

In short, this means that the level of extraction of the housing will automatically adjust to the amount of leakage flow.

Preferably, but not necessarily for the invention, the outlet opening is placed in the radial extension of the biggest gearwheel.

Indeed, the biggest gearwheel will generate the greatest 'gearwind', such that its effect will also be greater and more oil-air mixture can be led to the oil reservoir.

The invention also relates to a compressor or vacuum pump that is provided with a compressor or vacuum pump element and a motor to power the compressor or vacuum pump element and whereby the compressor or the vacuum pump element is also provided with a transmission according to the invention between a drive shaft of the motor and a driven shaft of the compressor or vacuum pump element.

BRIEF DESCRIPTION OF THE DRAWINGS

With the intention of better showing the characteristics of the invention, a few preferred embodiments of a transmission according to the invention and a compressor or vacuum pump equipped with such transmission are described hereinafter by way of an example, without any limiting nature, with reference to the accompanying drawings, wherein.

DETAILED DESCRIPTION OF THE INVENTION

Figure 1:
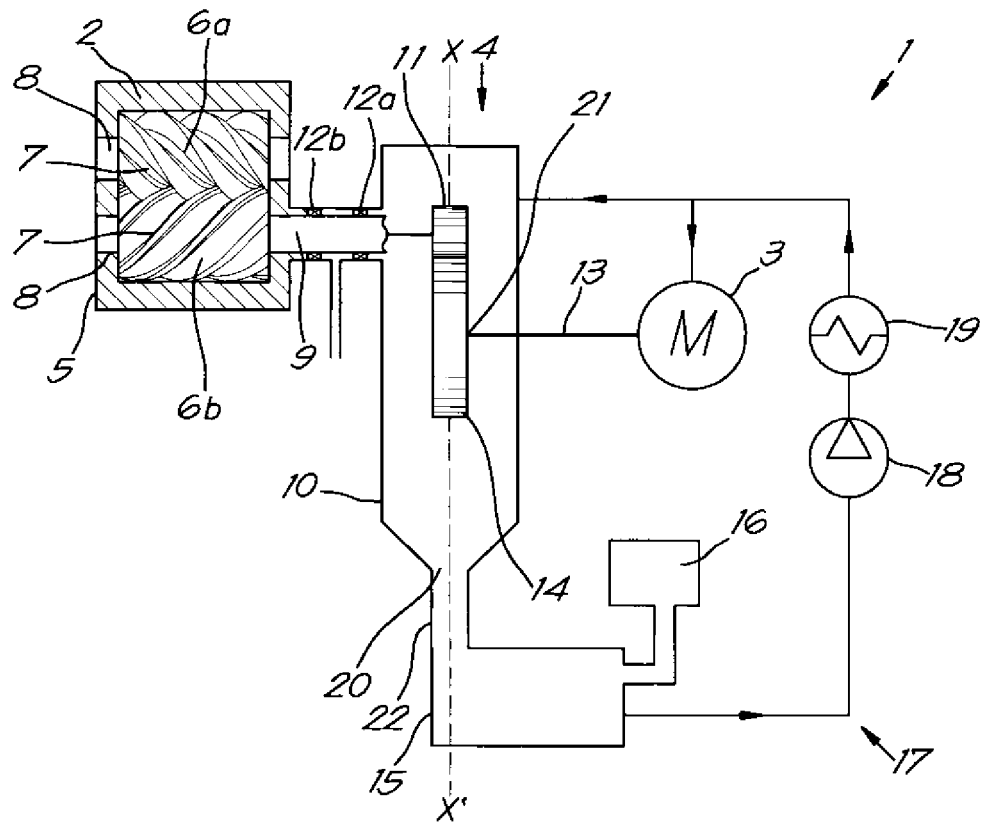
FIG. 1 schematically shows a transmission according to the invention.

The compressor 1 shown in FIG. 1 essentially comprises a compressor element 2, a motor 3 and a transmission 4 between the compressor element 2 and the motor 3.

The compressor element 2 is in this case a screw compressor element 2, which comprises a compressor element housing 5 and two co-operating screw rotors 6a, 6b, more specifically a male screw rotor 6a and a female screw rotor 6b, the lobes 7 of which turn into each other co-operatively.

Both rotors 6a, 6b are mounted with bearings by means of their shaft 8 in the compressor element housing 5.

The shaft 8 of one of the rotors 6b is extended and forms the driven shaft 9.

This driven shaft 9 reaches into the housing 10 of the transmission 4, and the driven gearwheel 11 is mounted at the end of it.

In order to close off the compressor element 2 from the transmission 4, two seals 12a, 12b are mounted on the driven shaft 9: an oil seal 12a and an air seal 12b.

The motor 3 has a drive shaft 13 that reaches into the housing 10 of the transmission 4 and on which a drive gearwheel 14 is mounted that engages on said driven gearwheel 11.

The transmission 4 comprises the aforementioned housing 10 with said gearwheels 11 and 14 therein.

Of course, it is not excluded that in the housing 10 additional gearwheels are mounted between the driven gearwheel 11 and the drive gearwheel 14.

Nor does this exclude that the motor 3 is located in the housing 10 of the transmission 4.

Furthermore, the transmission 4 is provided with an oil reservoir 15 and a filter element 16 connected to it, to be able to filter the oil out of the oil-air mixture which is ventilated via the oil reservoir 15 and filter element 16 into the atmosphere.

The injected oil is collected in the oil reservoir 15.

Furthermore, the compressor 1 in the shown example is also provided with an oil circuit 17, which can return the oil collected in the oil reservoir 15, i.e. the oil that flows back out of the housing 10 and the oil separated by the filter element 16, with an oil pump 18 back to the transmission 4 and/or the motor 3. Additionally, the oil circuit 17 is also provided with an oil filter 19 to be able to remove impurities from the oil.

According to the invention, the housing 10 of the transmission 4 is provided with an outlet opening 20, which is placed in the radial extension of the biggest gearwheel 14.

As aforementioned, this means that the outlet opening 20 extends according to a radial direction X-X' of the gearwheel 14. This means according to a direction X-X' of a line that extends from the centre 21 of the biggest gearwheel 14.

In this case the drive gearwheel 14 is the biggest gearwheel.

It is not necessary for the invention that the outlet opening 20 extends according to a radial direction of the biggest gearwheel, i.e. in this case the drive gearwheel 14. It is also possible that the outlet opening 20 extends according to a radial direction of a smaller gearwheel, in this case the driven gearwheel 11.

In the shown example, the outlet opening 20 is also placed under the drive gearwheel 14. This provides the advantage that gravity will help to transport the heavier oil particles in the housing 10 of the transmission 4.

Furthermore, in the shown example the outlet opening 20 is located in the X-X' plane of the drive gearwheel 14. This means the outlet opening 20 will not be located in front of or behind the X-X' plane of the gearwheel 14. This will also help to remove the oil-air mixture from the housing 10.

A discharge pipe 22, which connects to the outlet opening 20 and in this case extends in the X-X' plane of the gearwheel 14, runs from the outlet opening 20.

This discharge pipe 22 connects the housing 10 with the oil reservoir 15.

The operation of the compressor 1 is very simple and as follows.

During the operation of the compressor 1 the motor 3 will power the drive gearwheel 14, whereby the movement via the driven gearwheel 11 is transferred to the driven shaft 9 of the compressor element 2.

Oil will be injected in the transmission 4 and possibly also the motor 3 for the cooling and/or lubrication of the gearwheels 11, 14, bearings and other parts.

The operation of the compressor 1 will result in a certain pressure build-up in the transmission 4, as the air seal 12b on the driven shaft 9 will allow a certain leakage flow in the direction of the compressor element 2 toward the transmission 4.

Consequently, in the housing 10 of the transmission 4 there will be an oil-air mixture at an increased pressure.

The rotation of the drive gearwheel 14 will create a so-called "gearwind" whereby an air flow or vortex is generated by the rotating teeth of the gearwheel. This air flow is schematically shown by the arrows in FIG. 2.

This flow leads the oil-air mixture that is present in the housing 10 automatically to the outlet opening 20 as it were, and thus via the discharge pipe 22 to the oil reservoir 15 and the filter element 16.

Consequently, the supplied leakage air that ends ups in the housing 10 through the oil seal 12a will be immediately removed. This results in a limited negative or positive pressure in the housing 10 which falls within the permitted pressure difference of the oil seal 12a. From the outlet opening 20 the rest of the system, consisting of the discharge pipe 22, the oil reservoir 15 and the filter element 16, will be under positive pressure, which is determined by the drop in pressure over the filter element 16.

A separation of the oil can take place in the filter element 16, such that clean air can be ventilated into the atmosphere. The separated oil can be collected in the oil reservoir 15 and injected back into the machine 1 via the oil circuit 17.

Despite the fact that in the shown example, the outlet opening 20 is placed in the radial extension of the drive gearwheel 14 at the bottom of the housing 10, this is not necessary for the invention.

The outlet opening 20 could also be placed in the radial extension of the driven gearwheel 11, or of other gearwheels if present.

According to the invention it is also not necessary that it concerns a compressor 1 that is provided with a transmission 4 according to the invention. The machine 1 could also be a vacuum pump.

Figure 2:
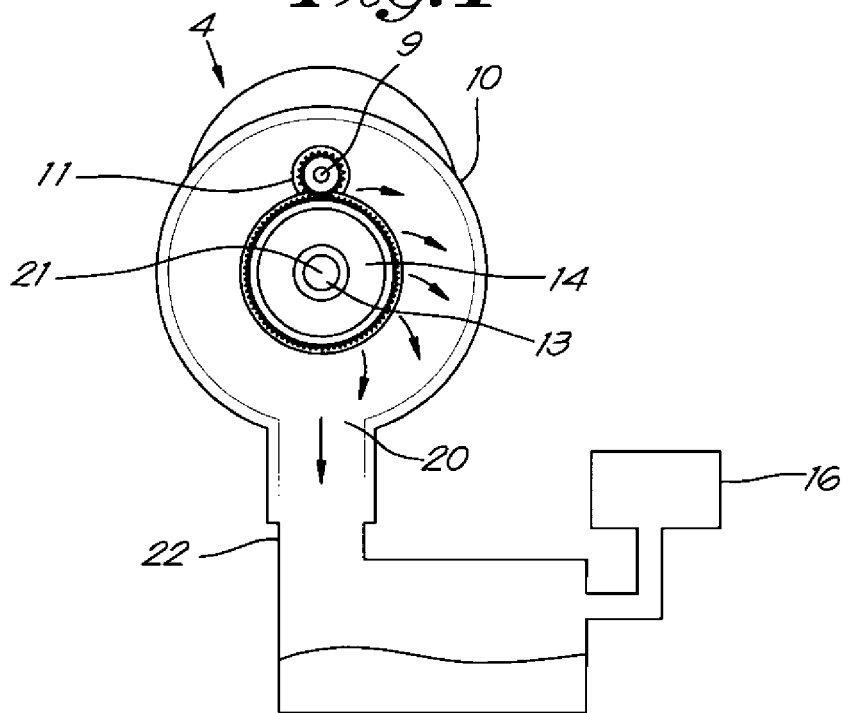
FIG. 2 schematically shows a view according to the cross-section X-X' of FIG. 1.
Figure 3:
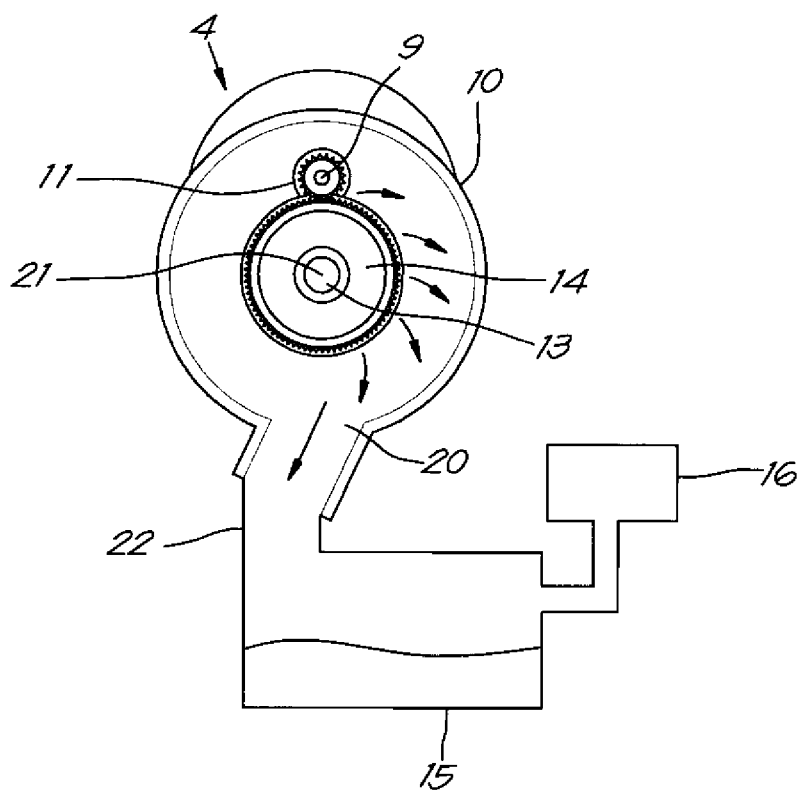
FIG. 3 schematically shows an alternative embodiment of FIG. 2.

FIG. 3 shows a variant of FIG. 2, whereby in this case the discharge pipe 22 does not extend in the radial extension of the drive gearwheel 14.

However, the discharge pipe 22 is placed at an angle with the radial direction X-X' of the drive gearwheel 14. However, the discharge pipe 22 still extends in the plane of the drive gearwheel 14.

Thanks to this sloping placement, the discharge pipe 22 follows the direction of the 'gearwind' more closely, such that an even better removal of the oil-air mixture from the housing 10 is obtained.

Moreover, in a machine 1, whereby the discharge pipe 22 for constructive and/or design reasons is not placed in the radial extension of the drive gearwheel 14, the discharge pipe 22 can also connect to the oil reservoir 15 according to another orientation or form.

For constructive and/or design reasons the drainage 20 can also be placed in front of or behind the X-X' plane of the gearwheel. This by, for example, guiding the gearwind of the gearwheel via the housing 10 to the outlet opening 20.

The present invention is by no means limited to the embodiments described as an example and shown in the drawings, but a transmission according to the invention and a compressor or vacuum pump equipped with such transmission can be realized in all kinds of forms and dimensions, without departing from the scope of the invention.

The invention claimed is:

1. A transmission between a drive shaft and a driven shaft, which transmission comprises:
    a housing and at least a driven gearwheel that is mounted on the driven shaft and a drive gearwheel that is mounted on a drive shaft, wherein the housing is provided with an outlet opening, and the outlet opening connects to a discharge pipe;
    wherein the outlet opening is placed in an extension of a radial of one of the gearwheels passing through a rotational axis of the one of the gearwheels or in an extension of a gearwind of the one of the gearwheels, and the discharge pipe extends from the outlet opening at an angle offset from the radial in a direction of the extension of the gearwind;
    whereby the outlet opening is configured for removing an oil-air mixture present in the housing from the housing, wherein oil of the oil-air mixture is injected in the housing and air from the oil-air mixture is leakage flow originating from a compressor or a vacuum pump element.

2. The transmission according to claim 1, wherein the outlet opening is placed in the radial extension of a biggest gearwheel.

3. A compressor provided with a compressor element and a motor to drive the compressor element, wherein the compressor is provided with a transmission according to claim 1 between the drive shaft of the motor and the driven shaft of the compressor element.

4. A vacuum pump provided with a vacuum pump element and a motor to drive the vacuum pump element, wherein the vacuum pump is provided with a transmission according to claim 1 between the drive shaft of the motor and the driven shaft of the vacuum pump element.

\* \* \* \* \*